Figure 1:
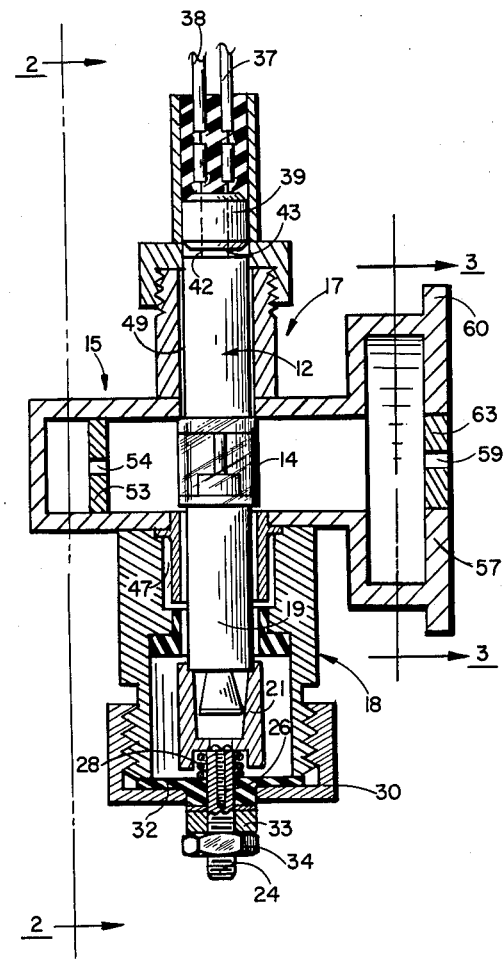

May 29, 1962 R. E. HOVDA ET AL 3,037,167
RADIO FREQUENCY PEAK POWER DETECTOR
Filed May 14, 1959 3 Sheets-Sheet 1

INVENTORS
ROBERT E. HOVDA
RAY W. MUHLESTEIN
BY
Edward A. Sokolski
AGENT

INVENTORS
ROBERT E. HOVDA
RAY W. MUHLESTEIN
BY
Edward A. Sokolski
AGENT

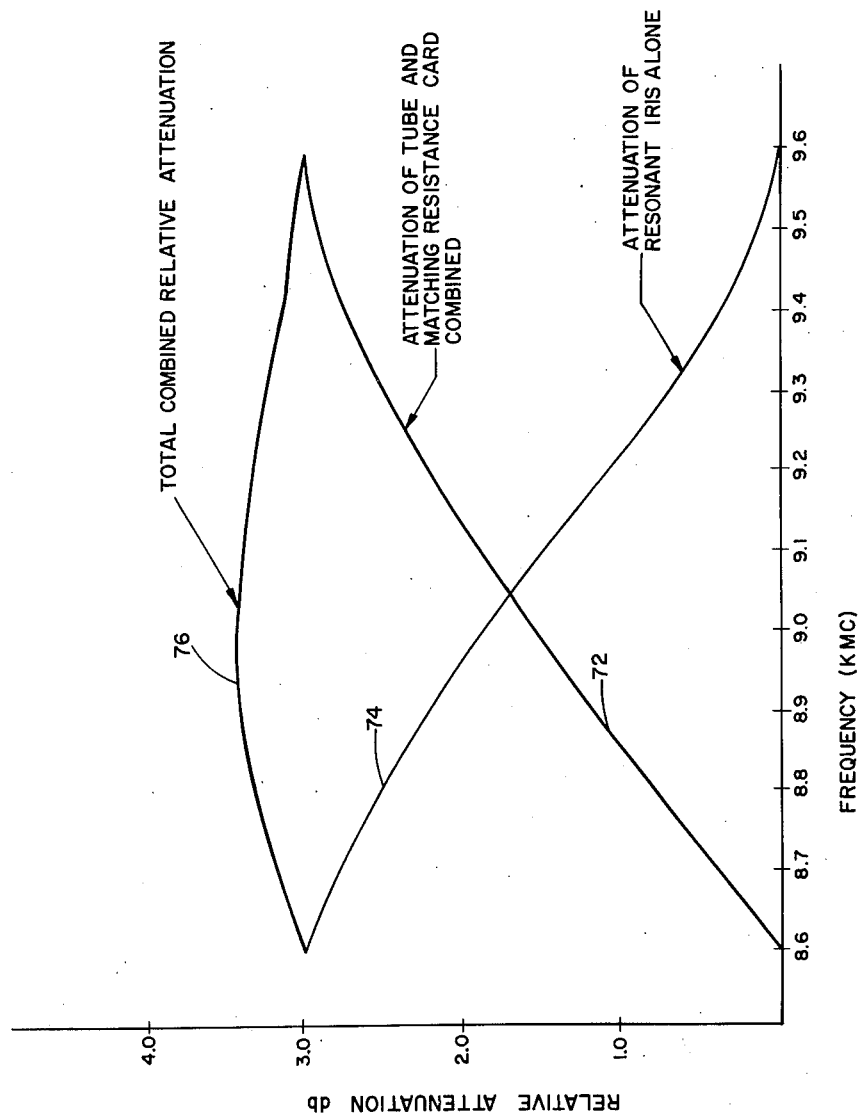

United States Patent Office 3,037,167
Patented May 29, 1962

3,037,167
RADIO FREQUENCY PEAK POWER DETECTOR
Robert E. Hovda, Buena Park, and Ray W. Muhlestein, Long Beach, Calif., assignors to North American Aviation, Inc.
Filed May 14, 1959, Ser. No. 813,149
10 Claims. (Cl. 324—95)

This invention relates to radio frequency peak power detectors and more particularly to such a power detector having a wide range of temperature stability which is suitable for use in detecting broadband microwave power.

To assure operating and maintenance personnel that radar and other similar microwave equipment is operating properly, it is highly desirable that some means for indicating the power output of such microwave device be available. To enable the checking of power output quickly and easily and under operating conditions, means for checking such power output is often incorporated into the microwave device. Many devices used for measuring the power output of broadband microwave systems use temperature sensitive elements. These include bolometer and thermocouple devices. These devices are generally adequate if ambient temperature is calibrated out of the measurement or if the ambient temperature is compensated for by other temperature sensitive elements. Such temperature compensation, however, is often difficult to achieve, especially where there are wide variations in ambient temperature. The bolometer has a particular disadvantage in that it is easily burned out by overloads. A thermocouple can be adapted to higher power levels but at microwave frequencies a considerable fraction of the RF power may not be available for use because of losses and poor matching. Other microwave power measuring equipment which is in the form of dummy loads is generally quite bulky and can only be utilized by making special connections to the microwave device which involve the total or partial disabling of the microwave equipment to be tested.

Accordingly, it is an object of this invention to provide a temperature stable power detector having linear response over a relatively broad band which is both compact and suitable for use in a normally operating system without the necessity for any special connections being made to the system while the test is being made. Semiconductor devices are unsuitable due to their inherent temperature instability. It has been found that thermionic microwave vacuum tubes of the planar type which includes lighthouse tubes and of the coaxial type which includes pencil tubes, exhibited the temperature stability characteristics desired, having a substantially constant output level over a temperature range of —50° C. to +125° C. Due to the transit time between their elements, however, such tubes by themselves provide a poor match at microwave frequencies, exhibiting a highly non-linear response over the range of the broad frequency bands which such equipments as radar utilize. This problem is overcome by the device of this invention which utilizes unique matching means comprising a slotted resistance card and a coupling iris. In accordance with a preferred embodiment, the microwave detector is mounted with its signal input portion within a waveguide section which is connected to receive the output of the microwave device whose power output is to be measured. A coupling iris is formed in one wall of the waveguide section opposite one side of the detector signal input portion. The output of the microwave device is appropriately coupled through this iris. The slotted resistance card is mounted within the waveguide section on the side of the detector input portion opposite from the side which is facing the coupling iris. The resistance card and the coupling iris are made to have combined attenuation characteristics over the predetermined band of desired response frequencies which compensate for the non-linear response of the waveguide mounted detector. In this manner, the output of the detector is linearized over the desired frequency response band.

The device of this invention provides an instantaneous reading and tracking of peak RF power. There is no time delay due to elements heating up or changing temperature. This device can be adapted for use with any wide band output microwave system such as a radar or similar system in which RF energy is propagated in a hollow tube. The output level of the device of this invention is not subject to variations with changes in temperature, and no bridges or temperature compensating circuits are required to achieve a stable output. The device of this invention is relatively rugged and not generally subject to overload blowout. The only recalibration generally required would be caused by aging of the detector tube, and with most detector tubes, such calibration should not be required but at infrequent intervals.

It is therefore an object of this invention to provide an improved radio frequency peak power detector.

It is a further object of this invention to provide a microwave peak power detector having a substantially uniform response over a relatively wide band of frequencies.

It is still another object of this invention to provide a microwave peak power detector having temperature stability over wide variations of ambient temperature.

It is still a further object of this invention to provide a rugged reliable peak power detector which is compact and simple in design.

It is a still further object of this invention to provide a microwave peak power detector which is incorporated into the equipment to be tested and which may be utilized during normal operation of such equipment.

Figure 2:
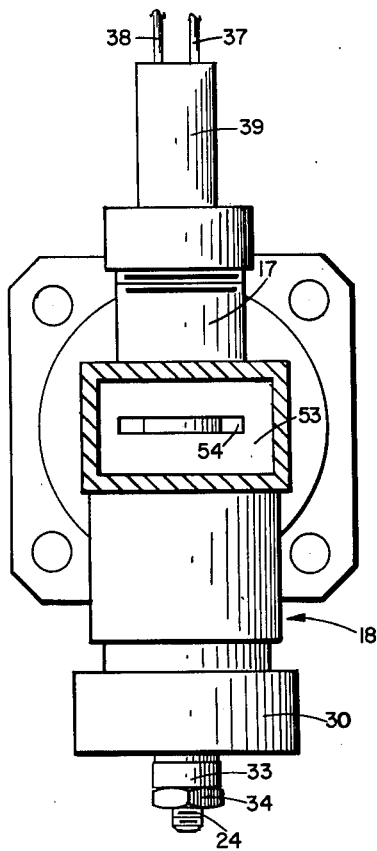
Figure 3:
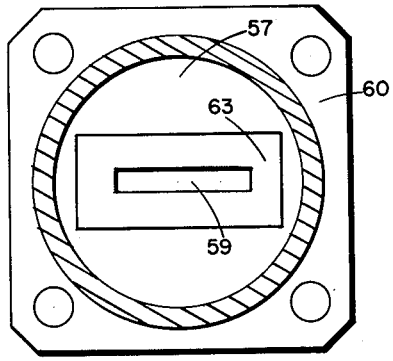
Figure 4:
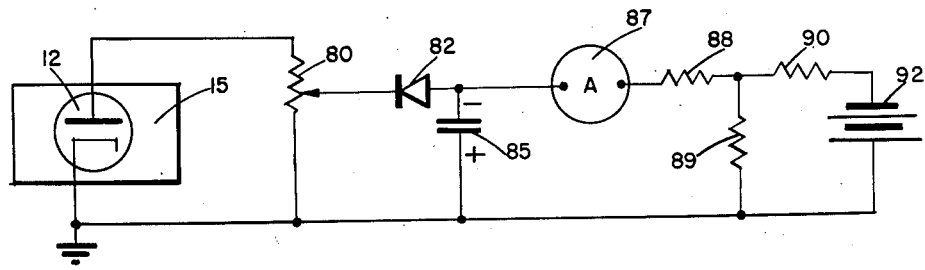

Other objects of this invention will become apparent from the following description taken in connection with the accompanying drawings in which:

FIG. 1 is an elevation cross-sectional view of a preferred embodiment of this invention, FIG. 2 is a cross-sectional view as taken along the line as indicated by 2—2 in FIG. 1, FIG. 3 is a cross-sectional view along the line as indicated by 3—3 in FIG. 1, FIG. 4 is a schematic drawing of a simple detection and indicating circuitry which may be used in the device of the invention, and FIG. 5 is a graph illustrating how output response is linearized in the device of the invention.

Referring to FIG. 1, a preferred embodiment of the invention is illustrated. A microwave diode 12 which may be of the coaxial pencil type (such as RCA tube type 6173) as illustrated, is mounted with its signal input portion 14 within waveguide section 15. The detector tube 12 is held within an upper cylindrical support portion 17 and a lower cylindrical support portion 18 which are also illustrated in FIG. 2. Both support portions 17 and 18 are fixedly attached to waveguide section 15 by soldering or other suitable means. The anode terminal 19 of diode detector 12 is removably inserted in holder 21 which is fabricated of resilient metal such as beryllium copper and should have suitable holding fingers (not shown) to adequately grip anode terminal 19. Holder 21 is fixedly attached to output terminal 24 by suitable means such as screw 26. Screw 26 is not tightened down completely so as to allow spring 28 to urge against holder 21 to hold the detector securely within support portions 17 and 18. A threaded cap 30 is provided to allow for easy detachment of the detector 12 and its associated holder and output terminal from the waveguide 15 and support portions 17 and 18. An insulating member 32 is provided to electrically insulate the electrical connections between anode terminal 19 and output terminal 24 from threaded cap 30. Nuts 33 and 34 are provided to facilitate the connection of output leads to output terminal 24.

Filament power for the detector 12 is supplied through leads 37 and 38 which are attached to connector 39. Connector 39, which is detachable, mates with filament leads 42 and 43 of detector tube 12. In the wall of support portion 18 and waveguide 15 is a double cavity 47 which acts as a folded half-wave choke. The overall linear dimensions of this cavity, i.e., from one extreme end to the other, should be the sum of the two quarter-wave sections or one-half wavelength at the center of the band of frequencies at which the device is to be operated. Another cavity 49 is formed in the wall of support portion 17 and waveguide 15. This cylindrical cavity also has a one-half wavelength overall linear dimension at the center of the band of frequencies at which the device is to be operated and also acts as a half-wave choke. These chokes are both shorted at their extreme ends (away from the entrance to the cavity of waveguide 15). They effectively provide a short circuit path at the junctions between support portion 17 and waveguide 15 and support portion 18 and waveguide 15 thereby preventing energy from the waveguide from entering these support portions. In this manner, these chokes prevent the unnecessary dissipation of energy in support portions 17 and 18. Choke 47 may be a conventional folded half-wave choke while choke 49 may be a conventional linear half-wave choke.

A rectangular resistance card 53 which can be more clearly seen by reference to FIG. 2 is mounted within waveguide section 15 approximately one-quarter wavelength (at the center of the band of frequencies to be detected) from the center of diode 12. A fiberglass resistance card having a metalized backing may be utilized, and resistance cards having a resistance of 100 ohms per square unit have been found to operate satisfactorily. Similar resistance cards are described on page 197 of volume 16 of the MIT Radiation Laboratory Series.

The exact means for accurately positioning this resistance card will be described later on in the specification. Once the exact position in which card 53 is to be located has been determined, the card is fixedly attached to the sides of waveguide 15 by cementing or other suitable means. Waveguide 15 has a circular portion 57 which has a coupling iris 59 in its end wall. A suitable mounting flange 60 may be utilized to connect the waveguide to the output of the source of radio frequency energy to be measured and thereby facilitate the coupling of such energy through iris 59. To facilitate fabrication, the iris, which must be precisely machined, may be cut in a rectangular metal plate 63 which may be suitably fixedly attached to the wall of waveguide section 15 by swaging, brazing or other suitable techniques. Plate 63 having iris 59 formed therein should be positioned approximately one-half wavelength (at the center of the band of frequencies to be detected) from the center of diode detector 12. The details of how the exact distance of iris plate 63 from the center of detector 12 and the dimensions of the iris can be determined for optimum results will be described further on in the specification.

It is to be noted that the design herein shown may be modified to accommodate planar and coaxial diodes other than the particular one shown for illustrative purposes. The important considerations in such a design should be the eliminatoin of energy transfer from the waveguide 15 to support portions 17 and 18 and the positioning and dimensional design of resistance card 53 and iris 59 relative to the detector for optimum performance, as described so far and as to be described in greater detail further on in the specification.

Referring now to FIG. 5, a series of graphs illustrating the operation of the device of the invention is illustrated. FIG. 5 illustrates the relative attenuation over a typical frequency range (8.6 through 9.6 kilomegacycles) in the radar X band. Graph 72 illustrates the typical relative attenuation versus frequency response which may be obtained by carefully positioning an appropriate resistance card 53 within waveguide 15 for optimum results. It is to be noted that the end result desired is to have uniform response over the entire band. However, at the same time, it is important that the total insertion loss be kept as low as possible. As a design criterion, it has been found that a maximum of slightly more than three db loss would be tolerable and the design indicated herein for exemplary purposes is predicated with this in mind.

Let us assume that the positioning of resistance card 53 within the waveguide and the dimensions of its slot 54 have been optimized for the most uniform response possible over the band commensurate with an insertion loss of under about 3 db to give a response as indicated by curve 72. Then, if the attenuation due to iris 59 is made to follow curve 74 so that the sum of curves 72 and 74 will produce curve 76 which represents the total relative attenuation over the entire frequency band, the desired end results will be achieved. In this instance, the sum of curves 72 and 74 illustrated will produce curve 76 which shows a total relative attenuation over the entire desired response band which is substantially 3 db.

Referring to FIGS. 1, 2 and 3, a design procedure to accomplish such end results might be as follows: Slot 54 in resistance card 53 should be dimensioned to be resonant at the center of the desired frequency response band. In essence, this slot will form a resonant iris. The design of such a resonant iris is described on page 254 of Principles and Applications of Waveguide Transmission by George C. Southworth published in 1950 by D. Van Nostrand Company. Making such a resonant iris in the resistance card produces a reactive component which tends to reduce the maximum impedance which the resistance card as combined with the detector tube and waveguide offer to frequencies at the extreme low frequency end of the response band and gives a more flattened or uniform response over the entire band. With the iris plate 63 removed and microwave energy in the desired response band being coupled into waveguide section 15, resistance card 53 should be experimentally positioned various increments of distance slightly greater and slightly less than a quarter wavelength (at the center of the response band) from the center line of tube 12. A special jig fixture (not shown) may be constructed to facilitate the experimental variation of this positioning while measurements are made of the output response of the tube for various frequency inputs over the desired response band. Curves may be plotted of the frequency response for each of these positions and then the position of optimum response selected which as already enumerated should be the most uniform response over the entire band commensurate with about 3 db or less attenuation at all frequencies. This optimum position may, for example, produce a response curve corresponding to curve 72 (FIG. 5).

Once the optimum position for the resistance card has been determined it should be fixed in place in the waveguide at this position. The approximate desired dimensions of coupling iris 59 should now be determined utilizing the formula and descriptive material contained in Southworth on page 254. For example, to give a combined uniform response where we have a combined tube and resistance card response such as that shown by curve 72 in FIG. 5, the coupling iris should be designed to have a resonant frequency at the extreme high frequency end of the response band. While formulas may be used to approximately calculate the required iris dimensions, optimum results may best be obtained empirically. Variations in the effective relative attenuation due to the resonant iris 59 may be achieved in two general fashions: (1) by varying the Q (figure of merit) of the iris, (2) by varying the position of the iris relative to the center line of detector 12. The Q of the iris varies inversely with its width or vertical dimension as pictured in FIG. 2. Q also varies inversely with the thickness of the plate 63 in which the iris is formed. Various metal plates 63, having different thicknesses and irises 59 with differing widths, may be experimentally tried for closest conformity with the desired frequency response curve 74 (with the iris positioned one-half wavelength at the center of the frequency response band from the center line of tube 12). Such measurements can perhaps be most easily taken by measuring the output of tube 12 with the resistance card 53 properly positioned for optimum results. When the most linear output response possible commensurate with no more attenuation than approximately 3 db anywhere in the desired frequency response band has been achieved, further experimentation should be unnecessary along these lines. The distance of iris 59 from the center line of tube 12 should then be varied by small increments greater and less than one-half wavelength at the center of the frequency response band. This can be done by utilizing a holding jig with which iris mounting plate 63 can be moved back and forth and output readings from tube 12 taken for these various positions. When a total output response similar to that shown by curve 76 has been attained, the optimum position for iris 59 has been determined and the position of waveguide wall 57 with iris plate 63 fixedly mounted therein should be established. Effectively then, an iris with the optimum dimensions and optimum positioning will produce an attenuation over the frequency response band due to its own characteristics and positioning which may correspond to that shown by curve 74. Such a response characteristic when combined with the response characteristic of a tube and matching resistance card which follows curve 72 will give a total relative attenuation over the entire desired frequency response band corresponding to curve 76. Such an attenuation characteristic of the detector combined with its surrounding circuit elements will produce substantially uniform detector output over the the entire desired frequency response band.

Referring now to FIG. 4, a schematic drawing of video detection and indicating circuitry which may be used in the device of this invention is illustrated. The output from diode 12 is fed across calibrating potentiometer 80. Potentiometer 80 has an output at its arm which is a video pulse directly proportional to the high power RF envelope fed from diode 12. This potentiometer may be adjusted to compensate for deviations in power level induced by variations in the value of all the other components used in the circuit. Diode 12 conducts only on the negative portion of the RF pulse. Therefore, diode 82 which may be a semiconductor type will conduct with output from the detector, allowing capacitor 85 to charge in the polarity indicated in FIG. 4. The capacitor charge time through part of potentiometer 80 and diode 82 is short compared to the discharge time through the discharge path comprising microammeter 87 and resistors 88 and 89. The capacitor discharge current through microammeter 87 and resistors 88 and 89 is directly proportional to the peak amplitude of the detected RF envelope. A reference voltage from power source 92 is connected across resistors 90 and 89. Power source 92 has ±1% tolerance. This establishes a constant reference voltage across resistor 89. When the voltage across capacitor 85 exceeds that across resistor 89, current will flow through microammeter 87. This current is proportional to the amplitude of the high power RF pulse and is referred to the 1% voltage standard established by power source 92. The use of the voltage standard in addition to establishing an accurate reference for absolute power measurements, also provides a meter scale factor amplification. The scale factor amplification is desirable because a small change in the voltage across capacitor 85 will now result in a greater meter deflection, thus increasing the meter's effective power sensitivity. The meter scale of microammeter 87 can be calibrated to read the RF peak power directly. This meter instantly indicates any changes in the transmitter power output. FIGURE 4 is exemplary of only one of many circuits which may be used to read the output from detector 12.

The device of the invention thus provides a simple, compact, and reliable means for reading peak power output of microwave devices generating broad band outputs.

While the invention has been described and illustrated in detail, it is to be clearly understood that the same is by way of illustration and example only and is not to be taken by way of limitation, the spirit and scope of this invention being limited only by the terms of the appended claims.

We claim:

1. In a radio frequency peak power detector, a waveguide section, a vacuum tube mounted within said waveguide section, and means for linearizing the output of said vacuum tube over a relatively wide band of radio frequencies comprising a coupling iris formed in one wall of said waveguide section, said iris being positioned on one predetermined side of said vacuum tube, and a resistance card mounted within said waveguide, said resistance card being positioned on the side of said vacuum tube opposite said one predetermined side.

2. The device as recited in claim 1 wherein said vacuum tube is a thermionic diode.

3. The device as recited in claim 1 wherein said vacuum tube is a coaxial type diode, and said resistance card has a slot therein dimensioned to form a resonant iris at the center of said band of response frequencies.

4. A radio frequency peak power detector comprising a waveguide section, a vacuum tube mounted at least partially within said waveguide section, said vacuum tube having a signal input portion mounted within said waveguide section, and means for linearizing the output of said vacuum tube over a predetermined band of frequencies comprising a coupling iris formed in one wall of said waveguide section opposite one side of said tube signal input portion, and a resistance card mounted in said waveguide section on the side of said tube input portion opposite said one side, said resistance card having a slot formed therein, said tube, coupling said iris, and said resistance card having substantially linear combined attenuation characteristics over said predetermined band of frequencies.

5. The device as recited in claim 4 wherein said resistance card is located substantially one-quarter wavelength distance and said iris is located substantially one-half wavelength distance, at the center of said predetermined band of frequencies, from the center line of said tube signal input portion.

6. A radio frequency peak power detector having substantially linear output over a predetermined frequency band comprising a waveguide section, a vacuum tube having a signal input portion mounted within said waveguide section, means for linearizing the output of said vacuum tube over said predetermined frequency band comprising a coupling iris formed in one wall of said waveguide section opposite one side of said tube signal input portion, said iris being positioned substantially one-half wavelength distance, at the center of said predetermined frequency band, from the center line of said input portion, and a resistance card mounted within said waveguide section on the side of said tube input portion opposite said one side, a broad surface of said resistance card facing said input portion and located substantially one-half wavelength, at the center of said predetermined frequency band, from the center line of said tube input portion, said tube, said coupling iris, and said resistance card having substantially linear combined attenuation characteristics over said predetermined frequency band, holding means fixedly attached to said waveguide section for supporting said tube, and choke means formed in said holding means for preventing the passage of radio frequency energy from said waveguide section to said holding means.

7. The device as recited in claim 6 wherein said resistance card has a slot formed in said broad surface thereof, said slot being dimensioned to form a resonant iris at the center of said predetermined frequency band.

8. The device as recited in claim 6 and additionally comprising a video peak detector coupled to receive the output of said vacuum tube, and indicating means for indicating the voltage output of said video detector.

9. A radio frequency peak power detector comprising a waveguide section, a vacuum tube mounted at least partially within said waveguide section, and matching means incorporated in said waveguide section for substantially linearizing the output of said vacuum tube over a predetermined band of frequencies, said matching means comprising a resistance card mounted within said waveguide section, a broad surface of said card facing one side of said vacuum tube and a coupling iris formed in one wall of said waveguide, said iris facing the side of said vacuum tube opposite said one side.

10. The device as recited in claim 9 wherein said resistance card is positioned substantially one-quarter wavelength and said iris is positioned substantially one-half wavelength, at the center of said predetermined frequency band, from the center line of said vacuum tube.

References Cited in the file of this patent

UNITED STATES PATENTS

| | | |
|---|---|---|
| 2,460,109 | Southworth | Jan. 25, 1949 |
| 2,649,544 | Zaleski | Aug. 18, 1953 |
| 2,791,691 | Pound | May 7, 1957 |
| 2,901,700 | Bolie | Aug. 25, 1959 |
| 2,912,619 | Collard | Nov. 10, 1959 |